United States Patent (10) Patent No.: US 9,170,963 B2
Han et al. (45) Date of Patent: Oct. 27, 2015

(54) APPARATUS AND METHOD FOR GENERATING INTERRUPT SIGNAL THAT SUPPORTS MULTI-PROCESSOR

(75) Inventors: Dong-Ku Han, Suwon-si (KR);
Kang-Min Lee, Suwon-si (KR);
Kyung-Ha Lee, Yongin-si (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 0 days.

(21) Appl. No.: 13/543,357

(22) Filed: Jul. 6, 2012

(65) Prior Publication Data

US 2013/0019032 A1 Jan. 17, 2013

(30) Foreign Application Priority Data

Jul. 11, 2011 (KR) .................. 10-2011-0068339

(51) Int. Cl.
*G06F 13/28* (2006.01)
*G06F 13/00* (2006.01)
*G06F 13/24* (2006.01)

(52) U.S. Cl.
CPC ............... *G06F 13/24* (2013.01); *G06F 13/28* (2013.01)

(58) Field of Classification Search
None
See application file for complete search history.

(56) References Cited

U.S. PATENT DOCUMENTS

| | | | | |
|---|---|---|---|---|
| 5,742,843 | A * | 4/1998 | Koyanagi et al. | 712/14 |
| 6,256,724 | B1 * | 7/2001 | Hocevar et al. | 712/35 |
| 6,321,323 | B1 * | 11/2001 | Nugroho et al. | 712/34 |
| 7,451,249 | B2 * | 11/2008 | Cowan et al. | 710/22 |
| 7,669,079 | B2 * | 2/2010 | Weiberle et al. | 714/10 |
| 7,680,972 | B2 * | 3/2010 | Inoue et al. | 710/260 |
| 7,725,663 | B2 * | 5/2010 | Bullman et al. | 711/152 |
| 7,836,320 | B2 * | 11/2010 | Harris | 713/324 |
| 8,090,983 | B2 * | 1/2012 | Weiberle et al. | 714/11 |
| 8,132,254 | B2 * | 3/2012 | Kershaw et al. | 726/18 |
| 8,135,920 | B2 * | 3/2012 | Kreuchauf et al. | 711/152 |
| 8,234,431 | B2 * | 7/2012 | Kruglick | 710/262 |
| 8,321,614 | B2 * | 11/2012 | Wolfe | 710/267 |
| 8,397,043 | B2 * | 3/2013 | Reipold et al. | 711/163 |
| 8,521,920 | B2 * | 8/2013 | Nito et al. | 710/22 |
| 2005/0148358 | A1 * | 7/2005 | Lin et al. | 455/550.1 |
| 2011/0047310 | A1 * | 2/2011 | Bonola | 710/268 |
| 2011/0219208 | A1 * | 9/2011 | Asaad et al. | 712/12 |
| 2013/0138850 | A1 * | 5/2013 | Yamashita et al. | 710/267 |
| 2013/0311685 | A1 * | 11/2013 | Kudo et al. | 710/40 |

* cited by examiner

*Primary Examiner* — Michael Sun
(74) *Attorney, Agent, or Firm* — Jefferson IP Law, LLP

(57) ABSTRACT

A method for generating an interrupt signal in a memory controller and supporting a multi-processor is provided. Whether an access for a determined memory region occurs is determined. When the access for the determined memory region occurs, whether the access for the determined memory region has a right is determined. When the access for the determined memory region has the right, a core that will generate an interrupt signal is determined. The determined core is requested to generate the interrupt signal.

20 Claims, 4 Drawing Sheets

APPARATUS AND METHOD FOR GENERATING INTERRUPT SIGNAL THAT SUPPORTS MULTI-PROCESSOR

PRIORITY

This application claims the benefit under 35 U.S.C. §119 (a) of a Korean patent application filed in the Korean Intellectual Property Office on Jul. 11, 2011 and assigned Serial No. 10-2011-0068339, the entire disclosure of which is hereby incorporated by reference.

BACKGROUND OF THE INVENTION

1. Field of the Invention

The present invention relates to an electronic device. More particularly, the present invention relates to a memory controller in an electronic device.

2. Description of the Related Art

The concept of a processor can be extended to include a Direct Memory Access (DMA) controller that may be regarded as an independent processor. That is, the DMA controller has a right for accessing a memory as a master right.

When data exist inside a memory during data exchange between processors, memory location information and an interrupt signal for the data may be provided to a processor which will receive the data. A representative method includes a mail box method between processors. Here, the mail box method is formed of a message and a hardware interrupt signal (e.g., an except signal).

When the processor or the DMA controller operates, the processor or the DMA controller generates an interrupt signal. That is, an interrupt signal is used as a means for controlling message exchange.

An Interrupt Service software Routine (ISR) reacting to an interrupt signal generated by hardware requires a minimum pre-processing time for context switching, and a delay of about 10 µs~50 µs is generated due to this pre-processing, depending on an operating system.

However, it is impossible to develop apparatus handler software using a method for processing all these interrupt signals only inside the ISR.

This is because an influence due to the ISR is different depending on a user operation, and because of an Application Programming Interface (API) call that is provided by an operating system when an ISR operates, that is, a system call should be accompanied, which unavoidably generates a delay and has a negative influence on a system performance.

Therefore, a technology for removing an interrupt signal delay is desired.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for generating an interrupt signal in a memory controller that supports a multi-processor.

Another aspect of the present invention is to provide a method and an apparatus for removing an interrupt signal delay in communication between processors.

Still another aspect of the present invention is to provide a method and an apparatus for generating an interrupt signal having flexibility in an aspect of software in communication between processors.

In accordance with an aspect of the present invention, a method for generating an interrupt signal in a memory controller supporting a multi-processor is provided. The method includes determining whether an access for a determined memory region occurs, when the memory access for the determined memory region occurs, determining whether the access for the determined memory region has a right, when the access for the determined memory region has the right, determining a core that will generate an interrupt signal, and requesting the determined core to generate the interrupt signal.

In accordance with another aspect of the present invention, an apparatus for generating an interrupt signal and using a multi-processor is provided. The apparatus includes a bus bridge and a data buffer for outputting an accessed memory address when an access for a memory occurs, and a memory protector for determining whether the access for the memory occurs via a memory bridge when the memory access occurs, for determining whether the access for the memory has a right, for, when the access for the memory has the right, determining a core that will generate an interrupt signal, and for requesting the determined core to generate an interrupt signal via an interrupt signal port.

In accordance with still another aspect of the present invention, an apparatus for generating an interrupt signal and supporting a multi-processor is provided. The apparatus includes a plurality of core units, a memory, a memory controller, for processing a memory access from a plurality of core units, arranged between the plurality of core units and the memory, for determining whether an access for the memory occurs, for, when the access for the memory occurs, determining whether the access for the memory has a right, for, when the access for the memory has the right, determining a core that will generate an interrupt signal, and for requesting the determined core to generate the interrupt signal, and an interrupt signal controller for receiving an interrupt signal generate request to generate an interrupt signal to the relevant core.

In accordance with further another aspect of the present invention, a controller for generating an interrupt signal and using a multi-processor is provided. The controller includes a memory protector for determining whether an access for a memory occurs, for, when the access for the memory occurs, determining whether the access for the memory has a right, for, when the access for the memory has the right and is included within a specific address range, determining a core that will generate an interrupt signal, and for requesting the determined core to generate the interrupt signal.

In accordance with yet further another aspect of the present invention, a controller for generating an interrupt signal and using a multi-processor is provided. The controller includes a memory controller including a multi-interrupt signal generator.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide an apparatus and a method for generating an interrupt signal that supports a multi-processor.

Particularly, exemplary embodiments of the present invention provide a method and an apparatus for removing a delay on a system due to an interrupt signal in a system having a multi-processor.

An exemplary embodiment of the present invention includes a configuration of adding an improved Modified Memory Protection Unit (MMPU) inside a memory controller and allowing the MMPU to process interrupt signal generation. In the present disclosure, a processor has the same meaning as a core, and the MMPU may be referred to as a memory protector.

Figure 1:
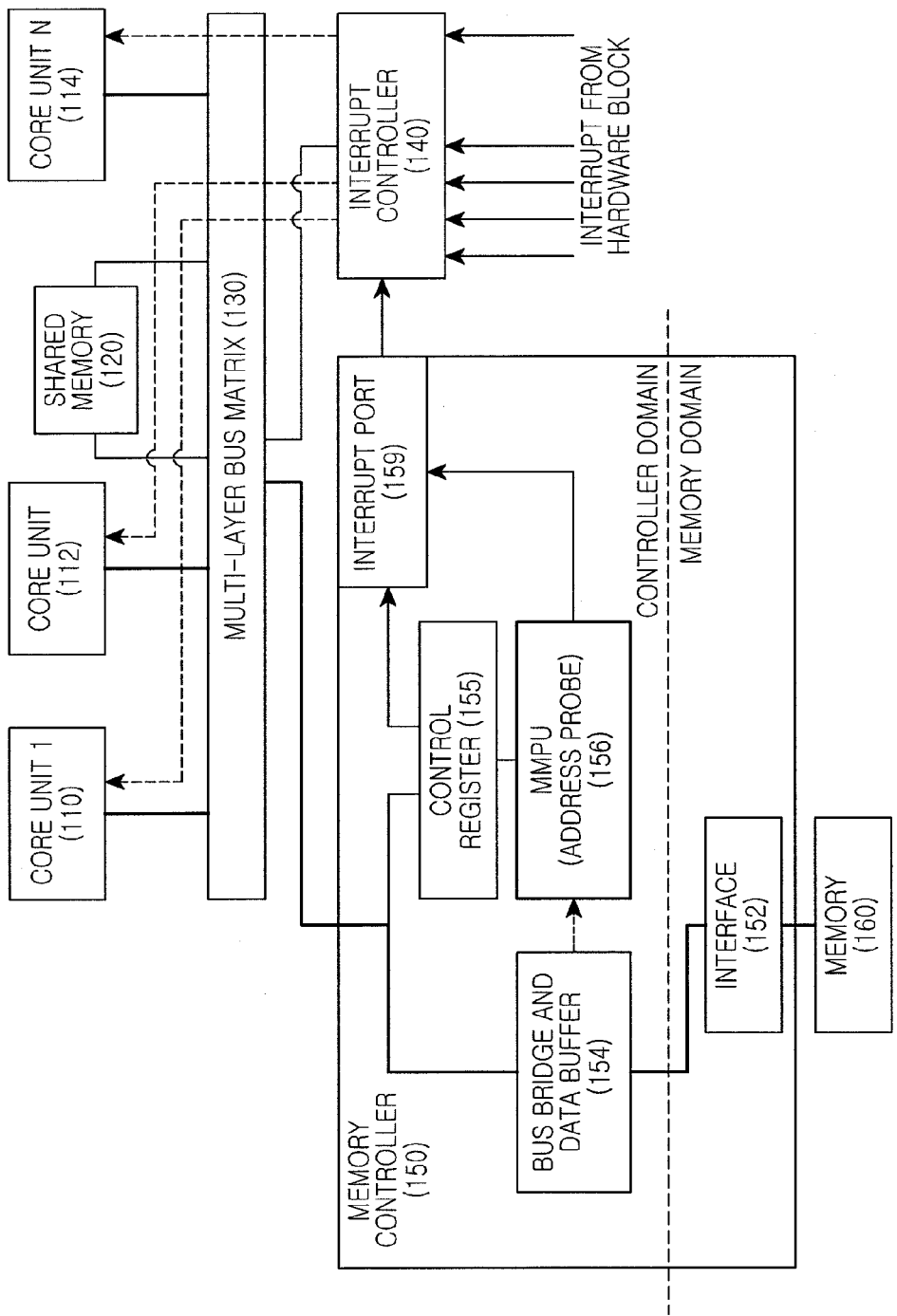
FIG. 1 is a block diagram illustrating a system having a multi-processor according to an exemplary embodiment of the present invention.

FIG. 1 is a block diagram illustrating a system having a multi-processor according to an exemplary embodiment of the present invention.

Referring to FIG. 1, the system having the multi-processor includes a plurality of core units 110, 112, 114, such as a Central Processing Unit (CPU) and a Direct Memory Access (DMA) controller, an interrupt controller 140, a memory controller 150, and a memory 160. A shared memory 120 may also be present.

The memory controller 150, the interrupt controller 140, and the plurality of core units 110, 112, 114 communicate with one another via a multi-layer bus matrix 130. In addition, the memory controller 150 performs a function of the above-described MMPU therein.

A general memory protector such as a Memory Management Unit (MMU) or Memory Protection Unit (MPU) exists close to a core unit. When an unauthorized access to an access protected region occurs, the general memory protector informs the core of an exception generation. The general memory protector performs a function of informing fatal error generation in an operating system. In addition, the conventional memory controller does not generate an interrupt signal for the purpose of Inter-Processor Communication (IPC) between core units.

However, the memory controller 150 additionally includes an MMPU 156 therein in order to generate an interrupt signal and perform a transfer function.

The MMPU 156 obtains an address of an accessed memory from a bus bridge and data buffer 154, when an address region arbitrarily set for an interrupt signal is accessed, retrieves and determines an interrupt receiver core synchronized with the accessed address region, and requests the interrupt controller 140 to generate a relevant interrupt signal via an interrupt port 159.

Here, the MMPU 156 may generate an interrupt signal via a hardware module performing a DMA controller function. Additionally, in the case where a memory region accessed by the DMA controller does not have an access right, it may be similarly determined that the MMPU 156 has no access right.

The bus bridge and the data buffer 154 receives a memory access (e.g., read/write) request of the plurality of core units 110, 112, 114 to access the memory 160 via an interface 152 as requested. In addition, a control register 155 performs a control function of the conventional memory controller and simultaneously selects an address region of the MMPU 156 for an interrupt signal and sets an interrupt signal method.

In the case where the control register 155 includes address region select information for an interrupt and interrupt method information (e.g., receiver/access condition/generation reason/signal method, etc.) via software, the MMPU 156 may receive this information from the control register 155 to set the same.

The interrupt controller 140 receives an interrupt signal generate request of the MMPU 156 via the interrupt port 159 to generate an interrupt signal to a relevant core. The interrupt port 159 serves as an interface between the interrupt controller 140 and the MMPU 156.

Figure 2:
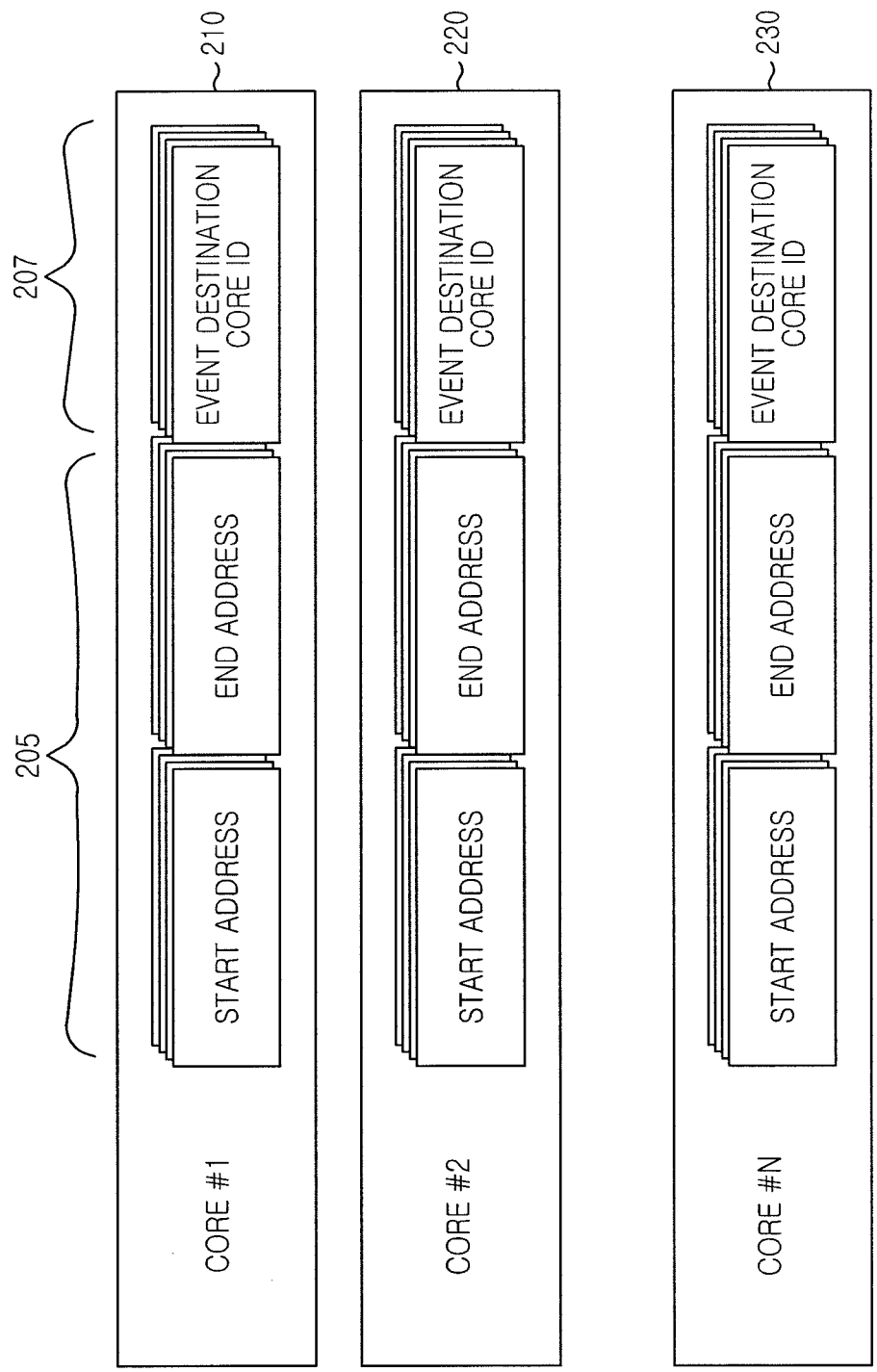
FIG. 2 is a view illustrating a register programmable at a Modified Memory Protection Unit (MMPU) according to an exemplary embodiment of the present invention.

FIG. 2 is a view illustrating a register programmable at an MMPU according to an exemplary embodiment of the present invention.

Referring to FIG. 2, a programmable register of the MMPU may include a memory address region 205 (e.g., start address and end address) allocated in every core 210, 220, 230, and a control register 207 that controls on a bit basis a relevant core IDentifier (ID) (event destination core ID)/select for each read/write circumstance/interrupt state information/signal level, etc., for generating an interrupt signal.

In other words, four pairs of register groups are illustrated with respect to each core. In the case where an access (e.g., read/write) occurs inside a specific memory address region (e.g., start address register value<=memory access address<=end address register value) based on the register group, the MMPU generates an interrupt signal to a relevant core based on control register information.

The MMPU has a programmable structure. That is, the MMPU may update, newly write, or delete information (e.g., start address, end address, and an interrupt method) via programming.

For example, when a specific interrupt occurs, in a case of intending to generate an interrupt signal to a plurality of cores, a plurality of cores may be set at an address region for generating a specific interrupt signal in the MMPU.

In a case of receiving an address of an accessed memory from the bus bridge and data buffer 154, the MMPU determines whether a coinciding address exists in a provided address list. When the coinciding address exists, the MMPU requests the interrupt controller 140 to generate an interrupt signal for a core corresponding to the coinciding address.

Figure 3:
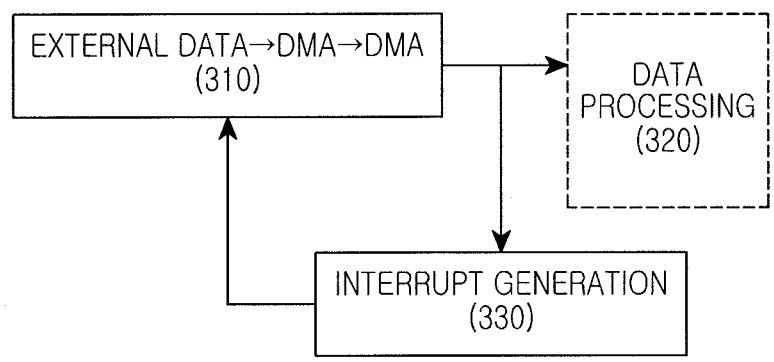
FIG. 3 is a view illustrating an operation process when an MMPU is used according to an exemplary embodiment of the present invention.

FIG. 3 is a view illustrating an operation process when an MMPU is used according to an exemplary embodiment of the present invention.

Referring to FIG. 3, unlike the conventional art, an exemplary embodiment of the present invention requires only two interrupt signals to be generated when accessing a memory.

An initial access is performed when external Media Access Control (MAC) frame data at a core of a modem unit is transferred to a memory by a DMA controller. The DMA controller operates again, when the data is converted into user data, to inform a CPU core of an interrupt at step 310. The data is read and processed by a user core at a reception side at step 320, and a process complete interrupt signal occurs at step 330.

This corresponds to a case of reducing the number of interrupts by half when compared to the conventional art. Here, an operation of informing an interrupt of DMA→DMA and automatically recognizing inversely that the processing is performed while the data is read is generated by the MMPU, so that a pre-processing is allowed to overlap in time and so an entire delay is reduced.

In an exemplary embodiment of the present invention, when an access occurs in a determined address region, an interrupt signal is automatically transferred to a destination core.

In addition, during the data processing, the MMPU of an exemplary embodiment of the present invention automatically recognizes that the data read processing is ending at a point of reading last data to transfer a relevant interrupt signal to an initial core (or DMA) inversely and reduce an ACKnowledge (ACK) transmission delay. That is, an interrupt signal may be automatically transferred to a relevant module (initial core) that has generated an access. The initial core may be a DMA controller.

Figure 4:
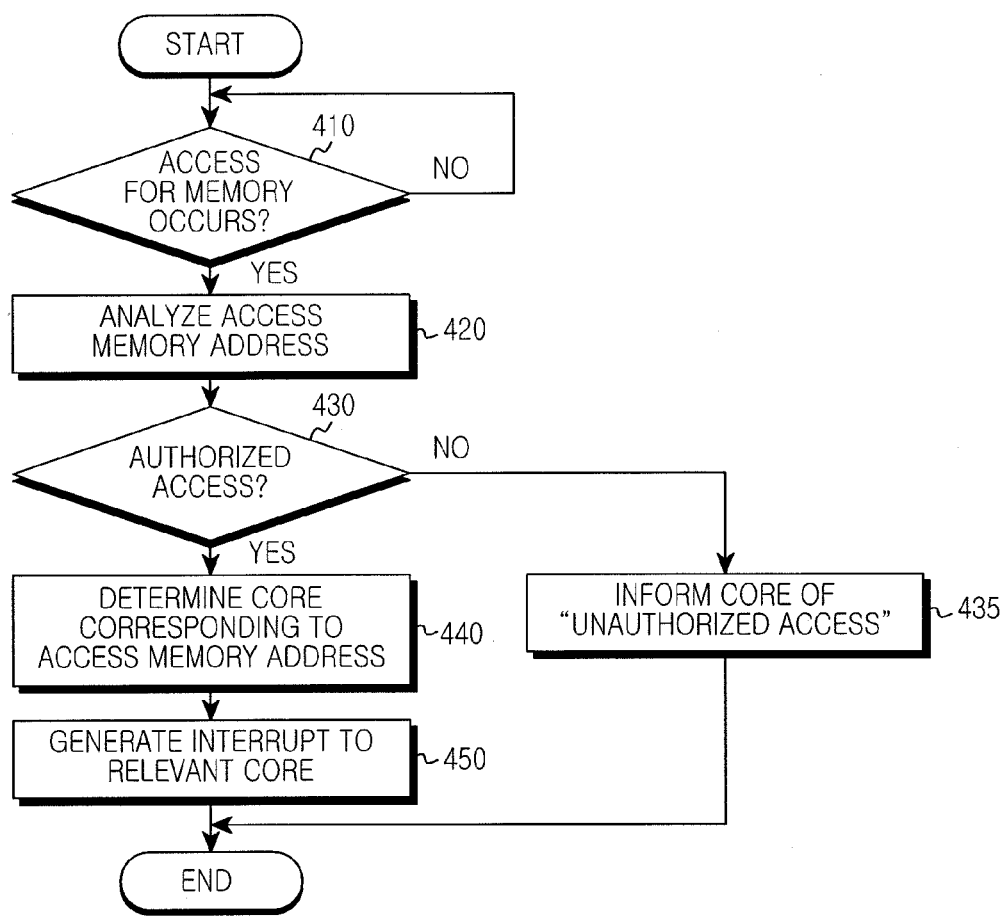
FIG. 4 is a flowchart illustrating a process for operating an MMPU according to an exemplary embodiment of the present invention.

FIG. 4 is a flowchart illustrating a process for operating an MMPU according to an exemplary embodiment of the present invention.

Referring to FIG. 4, when an access for a memory occurs at step 410, the MMPU analyzes an address of the memory where the access has occurred at step 420.

When the access is valid and is determined to have an access right as a result of the analysis at step 430, the MMPU determines a core corresponding to an access memory address at step 440, and requests an interrupt controller to generate an interrupt signal to the relevant core at step 450.

When the access is not determined to be valid or to not have the access right at step 430, the MMPU informs the relevant core of an "unauthorized access" at step 435.

Here, whether the access has the access right may be determined based on whether an access request address is included in a register group for generating an interrupt signal as illustrated in FIG. 2. The access request address may be included in a specific or arbitrary address range.

For reference, according to an exemplary embodiment of the present invention, an IPC function does not require a shared memory and may be realized without a limitation of memory resources. A method where a mail box transceiver includes a DMA controller is provided. In addition, an exemplary embodiment of the present invention may efficiently perform a data dump, etc. in cooperation with a DMA, without hindering a CPU core with various purposes including software debugging, depending on a method for setting a relevant register when setting an MMPU register.

A controller for generating an interrupt signal and using a multi-processor according to an exemplary embodiment of the present invention includes a memory controller including a multi-interrupt generator. The memory controller may omit a separate signal connection and an internal memory inside a System-on-Chip (SoC) for the purpose of transferring an interrupt signal between a plurality of processors. In addition, the memory controller may reduce a processing delay time by putting forward a response interrupt signal generate time reacting to a request interrupt signal of a transceiver end in a data flow. In addition, the memory controller may operate a Memory Protection Unit (MPU) for a DMA.

According to the present invention, when a DMA or a core accesses a memory, a MMPU automatically generates an interrupt depending on a selective case of a data access, so that an interrupt signal may be omitted or a delay may be reduced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for generating an interrupt signal in a multi-processor comprising a plurality of cores, the method comprising:
   accessing a memory address;
   determining, by a Modified Memory Unit (MMPU), a memory region that corresponds to the accessed memory address, when the access to the memory address has occurred;
   determining, by the MMPU, a core, among the plurality of cores, that corresponds to the determined memory region; and
   transmitting, by the MMPU, the interrupt signal to the corresponding core according to the memory access.

2. The method of claim 1, further comprising requesting a corresponding core to generate the interrupt signal when the access memory address of a memory block is in the determined memory region.

3. The method of claim 1, wherein determining of whether to allow the access for the determined memory region comprises determining whether the memory address where the access for the determined memory region has occurred is set in advance.

4. The method of claim 1, wherein the access for the determined memory region is performed by a core or a Direct Memory Access (DMA) controller.

5. An apparatus for generating an interrupt signal and using a multi-processor, the apparatus comprising:
   a bus bridge and a data buffer for outputting a requested accessed memory address set for the interrupt signal when an access for a memory is requested; and a Modified Memory Protection Unit (MMPU) for determining a memory region that corresponds to the accessed memory address via a memory bridge when the memory access is requested, determining a core that corresponds to the determined memory region, and for transmitting the interrupt signal to the corresponding core according to the memory access, wherein the core is one of the multi-processor.

6. The apparatus of claim 5, wherein the MMPU requests the corresponding core to generate the interrupt signal when the access memory address of a memory block is in the determined memory region.

7. The apparatus of claim 5, wherein, when determining whether to allow the access for the memory, the MMPU determines whether the memory address where the access for the memory occurs is set in advance.

8. The apparatus of claim 5, wherein the access for the memory is performed by a core of the multi-processor or by a Direct Memory Access (DMA) controller.

9. An apparatus for generating an interrupt signal and supporting a multi-processor, the apparatus comprising:
   a plurality of core units;
   a memory;
   a memory controller comprising a Modified Memory Protection Unit (MMPU) and arranged between the plurality of core units and the memory, for processing a requested memory access from the plurality of core units, for determining whether the access for the memory is requested for a region set for an interrupt signal, and for determining a core, among the plurality of core units, that corresponds to the determined memory region when the access for the memory is requested for the region; and
   an interrupt controller transmitting interrupt signal to the corresponding core according to the memory access,
   wherein the core comprises one of the multi-processor.

10. The apparatus of claim 9, wherein the memory controller comprises:
   a bus bridge and a data buffer for outputting an accessed memory address when the access for the memory occurs; and
   the Modified Memory Protection Unit (MMPU) for determining whether the access for the memory occurs via a memory bridge, and for determining the core corresponding to a determined memory and transmitting the interrupt signal to the core when the access for the memory occurs.

11. The apparatus of claim 10, wherein the MMPU requests the corresponding core to generate the interrupt signal when the access memory address of a memory block is in the region.

12. The apparatus of claim 10, wherein, when determining whether to allow the access for the memory, the MMPU determines whether a memory address where the access for the memory occurs is set in advance.

13. The apparatus of claim 10, wherein the access for the memory is performed by a core of the multi-processor or by a Direct Memory Access (DMA) controller.

14. A controller for generating an interrupt signal and using a multi-processor, the controller comprising:
   a Modified Memory Protection Unit (MMPU) for determining whether an access for a memory is requested, and for, when the access for the memory is requested and when the access for the memory is included within a specific address range, determining a core that corresponds to a determined memory region and transmitting the interrupt signal to the corresponding core according to the memory access,
   wherein the core comprises one of the multi-processor.

15. The controller of claim 14, wherein the MMPU requests the corresponding core to generate the interrupt signal when an access memory address of at least one memory block is within the specific address range.

16. The controller of claim 15, wherein the detection of the access for the memory is performed when the memory is accessed by a core of the multi-processor or by a Direct Memory Access (DMA) controller.

17. The controller of claim 14, wherein the controller further comprises:
   a memory controller comprising a multi-interrupt generator.

18. The controller of claim 17, wherein the memory controller is devoid of a separate signal connection and an internal memory inside a System-on-Chip (SoC) for a purpose of transferring an interrupt signal between a plurality of processors.

19. The controller of claim 17, wherein the memory controller reduces a processing delay time by putting forward a response interrupt signal generate time reacting to a request interrupt signal of a transceiver end in data flow.

20. The controller of claim 17, wherein the memory controller operates a Memory Protection Unit (MPU) for a Direct Memory Access (DMA).

* * * * *